US007190412B2

(12) United States Patent
Ellett

(10) Patent No.: US 7,190,412 B2
(45) Date of Patent: Mar. 13, 2007

(54) VIDEO SWITCHING SYSTEMS AND METHODS

(75) Inventor: Kirk D. Ellett, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 522 days.

(21) Appl. No.: 10/650,604

(22) Filed: Aug. 28, 2003

(65) Prior Publication Data

US 2005/0046748 A1 Mar. 3, 2005

(51) Int. Cl.
*H04N 5/268* (2006.01)
*H03K 17/62* (2006.01)

(52) U.S. Cl. ............ 348/705; 348/706; 345/8; 370/360; 340/14.1; 340/14.4; 340/2.28

(58) Field of Classification Search ........... 348/705, 348/706; 345/79; 370/360; 340/14.1
See application file for complete search history.

(56) References Cited

U.S. PATENT DOCUMENTS

| | | | | | |
|---|---|---|---|---|---|
| 5,036,395 | A | * | 7/1991 | Reimers ................. 348/722 |
| 5,276,445 | A | * | 1/1994 | Mita et al. ............. 340/2.24 |
| 5,343,193 | A | * | 8/1994 | Shoda et al. ........... 340/2.21 |
| 5,499,146 | A | * | 3/1996 | Donahue et al. ....... 386/117 |
| 5,502,512 | A | * | 3/1996 | Toyoda et al. ......... 348/706 |
| 5,565,929 | A | * | 10/1996 | Tanaka ................. 348/565 |
| 5,574,514 | A | * | 11/1996 | Tanihira et al. ....... 348/706 |
| 5,598,208 | A | * | 1/1997 | McClintock .......... 348/159 |
| 5,602,598 | A | * | 2/1997 | Shintani ............... 348/565 |
| 5,722,041 | A | * | 2/1998 | Freadman ............. 725/82 |
| 5,815,631 | A | * | 9/1998 | Sugiyama et al. ..... 386/46 |
| 5,867,223 | A | * | 2/1999 | Schindler et al. ..... 348/552 |
| 5,889,775 | A | * | 3/1999 | Sawicz et al. ........ 370/360 |
| 5,917,557 | A | * | 6/1999 | Toyoda ................. 348/705 |
| 5,929,895 | A | * | 7/1999 | Berry et al. ........... 725/77 |
| 5,937,176 | A | * | 8/1999 | Beasley et al. ........ 710/317 |
| 5,982,456 | A | * | 11/1999 | Smith et al. ........... 348/722 |
| 5,995,505 | A | * | 11/1999 | Nakasaka et al. ..... 370/360 |
| 6,064,422 | A | * | 5/2000 | Goolcharan et al. ... 348/14.12 |
| 6,327,253 | B1 | * | 12/2001 | Frink ................... 370/260 |
| 6,351,258 | B1 | * | 2/2002 | Satoh ................... 345/168 |
| 6,473,135 | B1 | * | 10/2002 | Iwamura ............... 348/706 |
| 6,530,085 | B1 | * | 3/2003 | Perlman ................ 725/82 |
| 6,593,973 | B1 | * | 7/2003 | Sullivan et al. ........ 348/584 |
| 6,618,098 | B1 | * | 9/2003 | Kaltani ................. 348/705 |
| 6,731,347 | B1 | * | 5/2004 | Takano et al. ......... 348/558 |
| 6,768,519 | B2 | * | 7/2004 | Fujita et al. ........... 348/705 |
| 6,816,485 | B2 | * | 11/2004 | Sato et al. ............. 370/362 |
| 2001/0024240 | A1 | * | 9/2001 | Fujita et al. ........... 348/705 |
| 2001/0052946 | A1 | * | 12/2001 | Sato .................... 348/706 |
| 2003/0095210 | A1 | * | 5/2003 | Huntley ................ 348/705 |

* cited by examiner

*Primary Examiner*—Brian P. Yenke
(74) *Attorney, Agent, or Firm*—Lee & Hayes, PLLC

(57) ABSTRACT

Systems and methods for performing video switching between multiple inputs and outputs are disclosed. In one embodiment, a system includes a video box coupled to one or more user interfaces, a plurality of video inputs, and a plurality of video outputs. The video box includes a video controller coupled to the one or more user interfaces and a video switch coupled to the plurality of video inputs and the plurality of video outputs. Activation of the user interface generates a video control signal that is sent to the generated video control signal. The video controller generates a video switching signal based on the received video control signal. The video switch connects one or more of the plurality of video inputs to one or more of the plurality of video outputs based on the generated video control signal.

24 Claims, 3 Drawing Sheets

VIDEO SWITCHING SYSTEMS AND METHODS

GOVERNMENT LICENSE RIGHTS

This invention was made with Government support under U.S. Government contract F33615-00-C-6061 awarded by the Air Force. The Government has certain rights in this invention.

FIELD OF THE INVENTION

This invention relates generally to video data control and, more specifically, to the control of multiple video data sources between multiple video data outputs.

BACKGROUND OF THE INVENTION

Complex systems having multiple components that provide data for presentation into one of many video data outputs, use complex video switch processors. The video switch processors allow an operator of a system (e.g. aircraft) to switch between multiple video sources at a particular display unit. Operator workloads are greatly reduced when they can view data from multiple sources on a single display unit.

Advanced helmets that include video display devices, such as the Strike Helmet 21 program, are most effective if they include connections to multiple video sources, such as multifunction display units included in control panels. Currently available video switches for advanced helmets do not have the appropriate quantities of inputs or outputs, do not provide crosspointing (i.e., an input drives one or more outputs simultaneously), are only available in non-rugged or oversized circuit card formfactors, and are controlled by nonstandard communication mechanisms.

Therefore, there exists a unmet need for a video switch for switching between multiple inputs and multiple outputs in an easy to implement form.

SUMMARY OF THE INVENTION

The present invention is directed to systems and methods for performing video switching between multiple inputs and outputs. In one embodiment, a system includes a video box coupled to one or more user interfaces, a plurality of video inputs, and a plurality of video outputs. The video box includes a video controller coupled to the one or more user interfaces and a video switch coupled to the plurality of video inputs and the plurality of video outputs. Activation of one of the user interfaces generates a video control signal that is sent to the video controller. The video controller generates a video switching signal based on the received video control signal. The video switch connects one or more of the plurality of video inputs to one or more of the plurality of video outputs based on the generated video control signal.

In accordance with further aspects of the invention, the plurality of video inputs include 16 video inputs and the plurality of video outputs include 16 video outputs.

In accordance with other aspects of the invention, one or more of the plurality of video outputs include a helmet display device.

In accordance with another aspect of the invention, the video box includes a Peripheral Component Interface (PCI) data bus for delivering the video switching signal.

In accordance with still further aspects of the invention, the video switch includes an interface device coupled to the data bus and a switch coupled to the interface device and the plurality of video inputs and outputs. The video switching signal is received by the interface device over the data bus. The interface device generates a video switch instruction based on the received video switching signal and sends the generated video switch instruction to the switch. The switch connects one or more of the video inputs to one or more of the video outputs according to the video switch instruction.

In accordance with still another aspect of the invention, the video switch is implemented on a circuit card that is formed according to the PCI mezzanine card (PMC) formfactor. The circuit card is a high temperature and conduction cooled card for use in a commercial-off-the-shelf (COTS) avionics box. The PMC formfactor allows the switch to be installed on an existing full-size circuit card, such as a VME card in the case of the advanced helmet Electronics Unit (EU), and to be controlled by the PCI data bus native to the VME card.

BRIEF DESCRIPTION OF THE DRAWINGS

The preferred and alternative embodiments of the present invention are described in detail below with reference to the following drawings.

DETAILED DESCRIPTION OF THE INVENTION

The present invention is directed to systems and methods for providing crosspoint switching between multiple video inputs and multiple video outputs. Many specific details of certain embodiments of the invention are set forth in the following description and in FIGS. 1–3 to provide a thorough understanding of such embodiments. One skilled in the art, however, will understand that the present invention may have additional embodiments, or that the present invention may be practiced without several of the details described in the following description.

Figure 1:
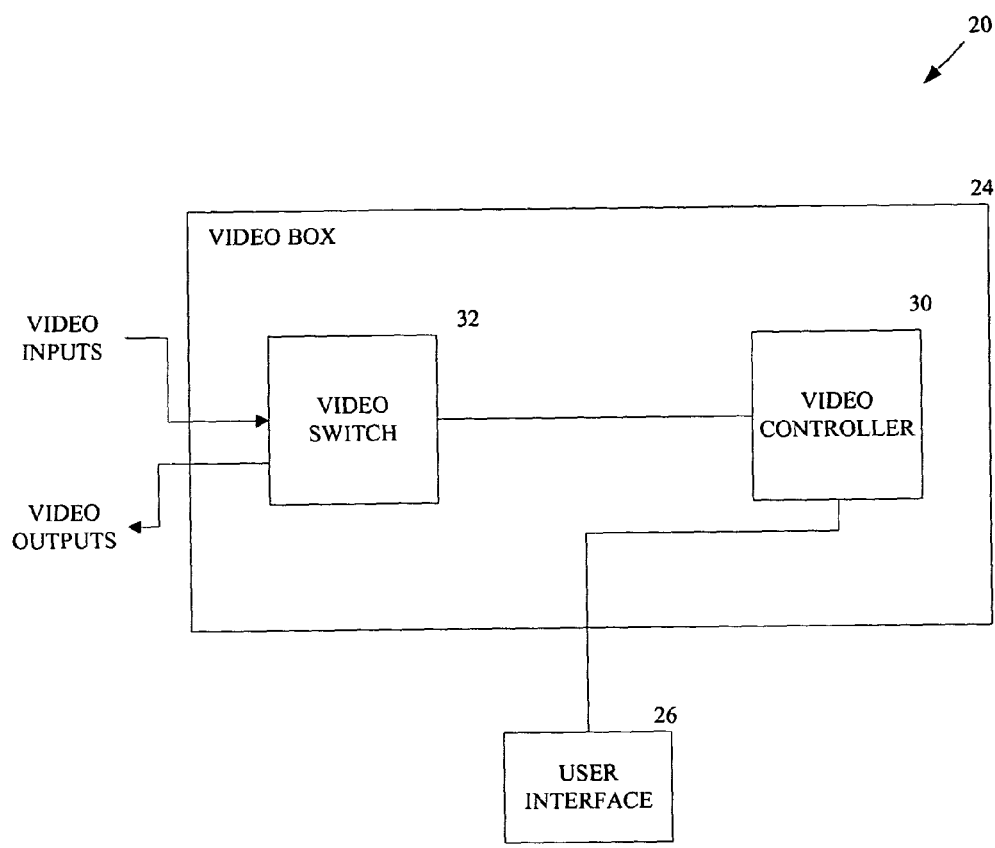
FIG. 1 is a block diagram of an embodiment of a system formed in accordance with the present invention.

As shown in FIG. 1, in one embodiment, a video controlling system 20 includes a video box 24 and a user interface 26. The video box 24 includes a video controller 30 coupled via a data bus to a video switch 32. The video switch 32 is coupled to a plurality of video inputs (e.g., a weapons system, flight data computer, etc.) and a plurality of video outputs (e.g., flight data recorder, helmet mounted displays, etc.). The user interface 26 is controlled by an operator, such as without limitation a pilot, for generating a video selection signal. The video selection signal is sent to the video controller 30 that sends a video switching signal to the video switch 32. Based on the switch signal, the video switch 32 makes a connection between one or more of the video inputs and one or more of the video outputs. The video switch 32 is described in more detail below with reference to FIGS. 2 and 3.

Figure 2:
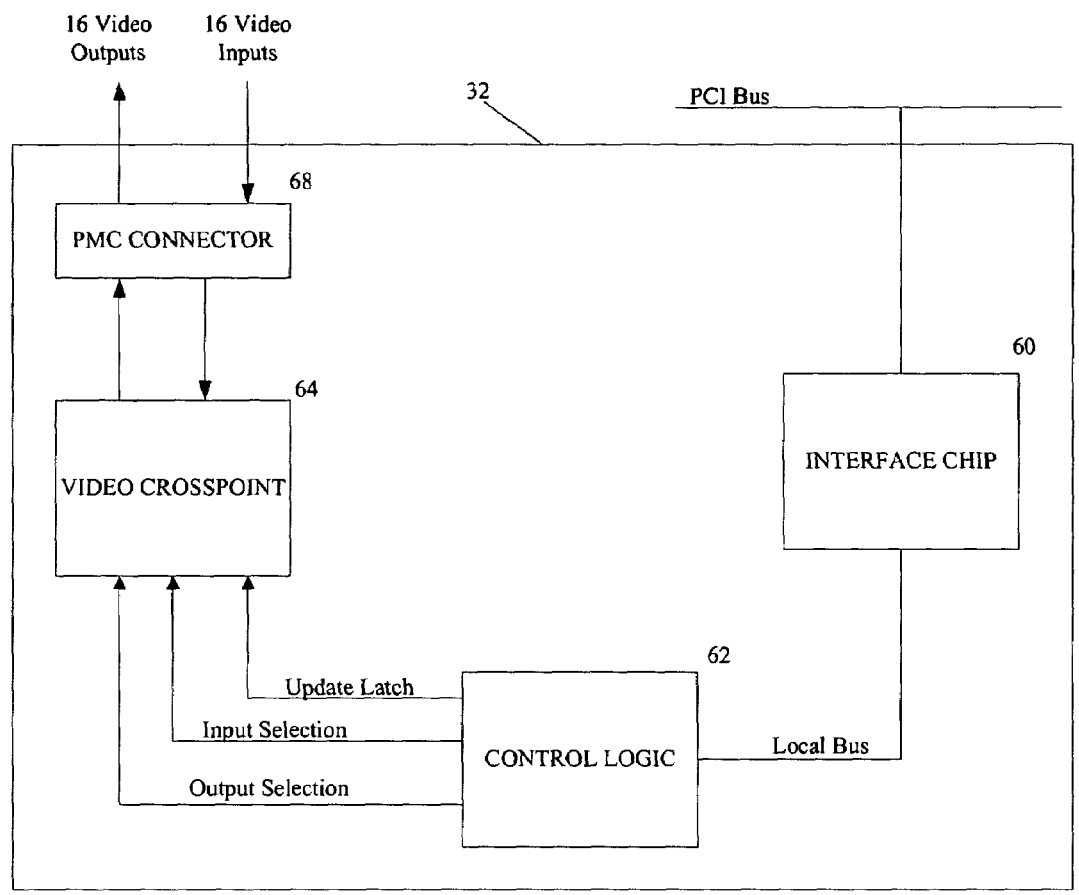
FIG. 2 is a block diagram of an embodiment of a switch device formed in accordance with the present invention.

In one embodiment, as shown in FIG. 2, the video switch 32 includes an interface chip 60, control logic 62, and a video crosspoint switch 64. The interface chip 60 is coupled to an external data bus and to the control logic 62 via an internal (local) data bus. The control logic 62 is coupled to the video crosspoint switch 64 which, in turn, is connected to input and output video sources via a pin connection 68. In a preferred embodiment, the video switch 64 may route up to sixteen analog composite video sources in one of a number of different video formats (e.g. RS-170, National Television System Committee (NTSC), Phase Alternation Line (PAL), RS-343, etc.) to up to sixteen video destinations.

The components of the video switch 32 may be implemented on a circuit board designed according to the Peripheral Component Interconnect (PCI) Mezzanine Card (PMC) formfactor, defined by the IEEE 1386.1 specification, as well as a conduction-cooled variant defined by ANSI/VITA-20.

In one particular embodiment, the interface chip 60 is a PCI interface chip that is connected to a PCI data bus via PMC connectors PN1 and PN2. Connectors PN1 and PN2 are both 64 pin connectors. The specifications for PMC allow for up to four 64 pin connectors; PN1 and PN2, for carrying power and the basic PCI interface. PN3 is an optional connector to provide 64 bit data bus as opposed to the 32 bit bus provided by PN1 & PN2. PN4 is an optional, device defined 64 pin connector, that is being used for our video signals.

Switch control commands are sent to the video switch 32 on the PCI bus, which are then placed on the local bus of the video switch 32 by the PCI interface chip 60 for collection and interpretation by control logic 62. The control logic 62 sends signals to the switch 64 for setting appropriate registers in the video crosspoint switch 64 to control the routing of video inputs to video outputs.

In another embodiment, the interface chip 60 is preferably a PLXTech PCI9030-AA60PI chip, which supports a 32 bit/33 MHz PCI bus. The PCI9030 chip may respond to PCI read and write commands received from the video controller 60 or may selfinitiate PCI transactions. The PCI9030 chip may use three of six available Base Address Registers (BARs) to map into the PCI bus. The first two BARs may be used to map PCI9030 configuration registers into PCI memory and I/O space respectively, while the third BAR maps a single 32-bit word from the local bus of the video switch 32 into PCI memory space. The video controller 30 may send (i.e., write to appropriate location on the PCI bus) 32-bit command words to the video switch 32 to control the video switch 32. When a command word is written to the appropriate location on the PCI bus, the PCI9030 chip writes the command word to the local bus for retrieval by the control logic 62. Because there is only a single memory location accessible by the video controller 30, all command words are written to the same location, and the control logic 62 is responsible for buffering and handling multiple command words written in succession.

The command word includes information to set the state of a single output on the crosspoint switch 64. In one embodiment, the word is partitioned as follows:

Bits 8–5 of the command word form the video output selection field O3-O0, which selects which of the sixteen video outputs 0–15 this command word will configure. Bit 4 is an Output Enable flag, which if set to 0 configures the output indicated by the output selection field to a high impedance, (i.e., undriven state). If the Output Enable flag is set to 1, then the output indicated by the output selection field is driven by the signal at the input designated by an input selection field I3-I0 in bits 3–0. Bits 31–9 are reserved and are set at zero. It will be appreciated that the structure of the command word can be altered provided all communicating components understand what the structure is.

To change more than one output routing the host device must simply write multiple 32-bit command words to this PCI location. This is done to simplify the control logic instead of parsing multiple switch configurations in a single command word. This can be accomplished, because the speed of the interface bus is dramatically faster than the "data rate" of video; all 16 video outputs can be commanded to switch sequentially in less time it takes to draw a single line of video on a screen.

The following is an example C language driver generated by the video controller 30 for configuring the video switch 32:

```
typedef struct
{
    unsigned char inchan;
    unsigned char enabled;
} ChanVal;
typedef struct
{
    int b;
    int d;
    int f;
    unsigned long *address;
    ChanVal outchan [16];
} SwitchHandleStruct;
static SwitchHandleStruct shs;
SwitchHandle
SwitchInit ( )
{
    int i;
    unsigned long sendval = 0;
    memset (&shs, 0, sizeof (SwitchHandleStruct));
    if (pciFindDevice(0xBAAC, 0x0001, 0, &shs.b, &shs.d,
    &shs.f) == ERROR)
    {
        return 0;
    }
    pciConfigInLong(shs.b, shs.d, shs.f,
    PCI_CFG_BASE_ADDRESS_2, (int*) (&shs.address));
    for(i=0; i < 16; i++)
    {
        sysOutLongNoSwap((int)shs.address, sendval);
        shs.outchan[i].inchan = (unsigned char)i;
        shs.outchan[i].enabled = 0;
        sendval += 0x21; /*Increments 0–3 and 5–8*/
    }
    return 0;
}
int
SetSwitch(SwitchHandle sh, unsigned char outchan, unsigned char inchan, Unsigned char enabled)
```

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| X | X | X | X | X | X | X | X | X | X | X | X | X | X | X | X | X | X | X | X | X | X | X | 03 | 02 | 01 | O0 | OE | I3 | I2 | I1 | I0 |

```
{
    unsigned long sendval = 0;
    shs.outchan[outchan].inchan = inchan;
    shs.outchan[outchan].enabled = enabled;
    sendval = (outchan & 0xf) << 5;
    if(enabled)
        sendval |= 0x10;
    sendval |= (inchan & 0xf);
    sysOutLongNoSwap((int)shs.address, sendval);
    return 0;
}
int
GetSwitch(SwitchHandle sh, unsigned char outchan, unsigned char*
inchan, Unsigned char *enabled)
{
    *inchan = shs.outchan[outchan].inchan;
    *enabled = shs.outchan[outchan].enabled;
    return 0;
}
```

Figure 3:
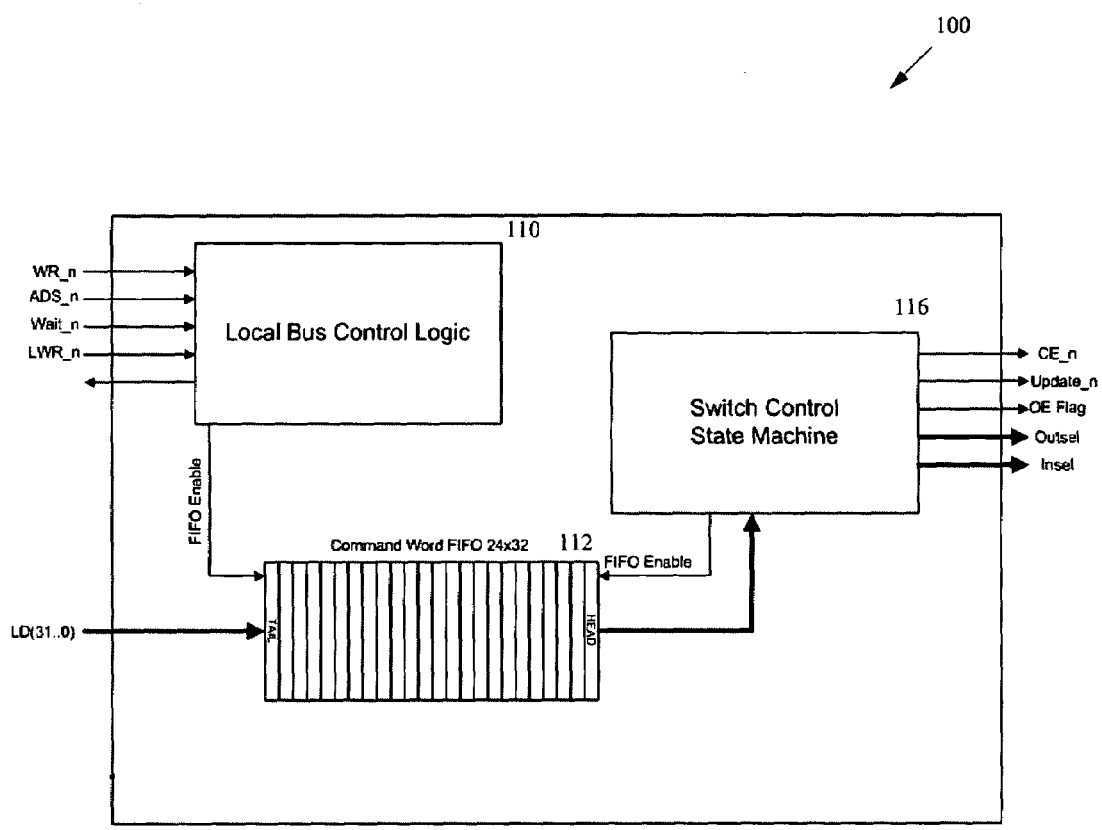
FIG. 3 is a block diagram of an embodiment of control logic within a switch device in accordance with a further embodiment of the present invention.

In yet another embodiment, the control logic 62 may be a Field Programmable Gate Array (FPGA), such as an Altera Flex 10K40 FPGA model EPF10K40RC208-3, that has been programmed to configure the FPGA to implement the control logic shown in FIG. 3. The FPGA reads command words placed on the local bus by the interface chip 60. As shown in FIG. 3, an FPGA 100 includes local bus control logic 110 coupled to a command word first in first out (FIFO) buffer 112, which is coupled to a Switch Control state machine 116. The local bus control logic 110 interprets local bus control signals, such as Write Enable (WR_n), Address Select (ADS_n), Wait and Ready states (Wait_n), and Local Write Enable (LWR_n), received from the interface chip 60 to interface the incoming command word with the 32-bit wide by 24-word deep FIFO 112. The FIFO 112 may buffer multiple successive command words, because in one representative embodiment, the PCI bus may be a 33 MHz bus while the interface to the crosspoint switch chip may operate at 750 kHz. If more command words are sent than there is room in the FIFO 112, the local bus control logic 110 may halt the PCI data bus transaction until the FPGA 100 can catch up, effectively forcing the video controller 30 to wait.

With continued reference to FIG. 3, the Switch Control state machine 116 checks the command word FIFO 110 for waiting command words, retrieves the oldest command word, and breaks the command word into the components the crosspoint switch chip expects. With the input select values (Insel), output select values (Outsel), and output enable flag value (OE flag) driven to the crosspoint switch, the Switch Control state machine 116 latches the input and output command values into the crosspoint switch. CE_n is chip enable. CE_n is asserted on the crosspoint switch chip before the video crosspoint switch 64 will accept any interface changes. Since the crosspoint switch 64 is the only device on this particular bus except for the FPGA 100, the crosspoint switch 64 can be asserted continuously. After the values have been latched, the Switch Control state machine 116 strobes an update signal (Update_n) to the crosspoint switch, thereby, changing the routing within the crosspoint switch.

In one embodiment, the video crosspoint switch 64 is an Analog Devices AD8115AST chip. The video crosspoint switch 64 routes inputted video signals to video outputs. The video crosspoint switch 64 may amplify a single video input signal that is to be propagated to multiple video outputs. In the above-referenced preferred embodiment, the sixteen video signal inputs coupled to the crosspoint switch 64 include a pair of wires each, one for the signal and one for a return. All analog video signals require a return wire for current return, ground reference, and impedance matching. This is the outer conductor on coaxial video wire. The sixteen output signals also are paired, for a grand total of 64 wires to be routed off of the video switch 32. With regards to PMC specifications, the 64 pin PN4 connector connects to the 64 wires.

The video switch 32 may be installed on a host device (not shown) such as a single board computer (SBC) that may include a variety of formfactors. The host device may provide electrical power to the video switch 32. In one embodiment, power on the SBC comes in four voltages, +5VDC, +3.3VDC, +12VDC, and −12VDC, and is provided on connectors PN1 and PN2 according to the PMC specification. The host device provides a PCI bus for the video switch 32 to attach to. The PCI bus may be implemented on connectors PN1 and PN2 according to the PMC specification. The video switch 32 relies on a PCI data bus master on the host device, usually a CPU chip (i.e., video controller 30) such as a Motorola PowerPC or an Intel Pentium, for commands. The host device routes signals from a connector PN4 to points where video sources and destinations can be connected.

In one embodiment, the video switch 32 is designed to operate in a high temperature, low airflow condition. In one exemplary embodiment, for example, the operational temperature range is −25° C. to 71° C., measured at thermal interfaces included on the video switch 32. The video switch 32 may conform to the Conduction Cooled PMC specification ANSI/VITA-20, which requires the host device to sink heat away at the thermal interfaces, usually with metal rib mounting points. The video switch 32 may operate in traditional airflow cooled environments with hosts that conform to IEEE 1386.1.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A device for switching between a plurality of video inputs and a plurality of video outputs, the device comprising:

an interface device coupled to a data bus; and a switch coupled to the interface device and a plurality of video inputs and outputs, the switch including a control logic component operatively coupled to a video crosspoint switch that is, in turn, coupled to the plurality of video inputs and the plurality of video outputs; and wherein when a video switching signal is received by the interface device over the data bus, the interface device transmits the video switching signal to the control logic component, the control logic component being configured to interpret the video switching signal, to generate a video switch instruction based on the received video switching signal, and to send the generated video switch instruction to the video crosspoint switch, the video crosspoint switch being configured to connect one or more of the video inputs to one or more of the video outputs according to the video switch instruction, and wherein the control logic component includes
a local bus control logic component configured to receive and interpret control signals from the interface device;
a command word buffer coupled to the local bus control logic component and configured to receive and buffer command words from the interface device, and local commands from the local bus control logic component; and a switch control state machine coupled to the command word buffer and configured to receive command words from the command word buffer and to condition the command words into an output signal suitable for input to the video crosspoint switch.

2. The device of claim 1, wherein the switch is coupled to one or more helmet display devices.

3. The device of claim 1, wherein at least a portion of the switch is constructed according to a PMC formfactor.

4. The device of claim 3, wherein the device is implemented on a single circuit board.

5. The device of claim 4, wherein the interface device is adaptable to connect to a PCI data bus.

6. The device of claim 5, wherein the circuit board is coupled to the PCI data bus within a video box.

7. A method for switching between a plurality of video inputs and a plurality of video outputs, the method comprising:

receiving a video switching signal at an interface device of a switch device;

generating a video instruction at the interface device based on the received video switching signal;

sending the generated video instruction to a switch, the switch including a control logic component operatively coupled to a video crosspoint switch that is, in turn, coupled to the plurality of video inputs and the plurality of video outputs, the control logic component receiving and interpreting the video instruction and outputting a video switch instruction to the video crosspoint switch based on the received video instruction; and connecting one or more of the video inputs to one or more of the video outputs according to the video switch instruction using the video crosspoint switch, wherein sending the generated video instruction to a switch including a control logic component includes sending the generated video instruction to a switch including a control logic component having:

a local bus control logic component configured to receive and interpret control signals from the interface device;

a command word buffer coupled to the local bus control logic component and configured to receive and buffer command words from the interface device, and local commands from the local bus control logic component; and a switch control state machine coupled to the command word buffer and configured to receive command words from the command word buffer and to condition the command words into an output signal suitable for input to the video crosspoint switch.

8. The method of claim 7, wherein the video outputs include one or more helmet display devices.

9. The method of claim 7, wherein receiving the video switching signal includes receiving the video switching signal from a PCI data bus.

10. A video system comprising:
a video box comprising:
a video controller; and
a video switch including a control logic component operatively coupled to a video crosspoint switch;
one or more user interfaces coupled to the video controller;
a plurality of video inputs coupled to the video crosspoint switch; and
a plurality of video outputs coupled to the video crosspoint switch, wherein activation of the user interface generates a video control signal and sends the generated video control signal to the video controller, the video controller generates a video switching signal based on the received video control signal and transmits the video switching signal to the control logic component, the control logic component being configured to interpret the video switching signal, to send a video switch instruction to the video crosspoint switch, and the video crosspoint switch being configured to connect one or more of the plurality of video inputs to one or more of the plurality of video outputs based on the generated video switch instruction, and wherein the control logic component includes
a local bus control logic component configured to receive and interpret control signals from the interface device;

a command word buffer coupled to the local bus control logic component and configured to receive and buffer command words from the interface device, and local commands from the local bus control logic component; and a switch control state machine coupled to the command word buffer and configured to receive command words from the command word buffer and to condition the command words into an output signal suitable for input to the video crosspoint switch.

11. The system of claim 10, wherein the plurality of video inputs include 16 video inputs and the plurality of video outputs include 16 video outputs.

12. The system of claim 10, wherein one or more of the plurality of video outputs include a helmet display device.

13. The system of claim 10, wherein the video box includes a data bus for delivering the video switching signal.

14. The system of claim 13, wherein the data bus is a PCI bus.

15. The system of claim 14, wherein the video switch is coupled to the PCI bus.

16. The system of claim 15, wherein the video switch is implemented on a single circuit board according to a PMC formfactor.

17. The system of claim 13, wherein the video switch includes:
an interface device coupled to the data bus; and
a switch coupled to the interface device and the plurality of video inputs and outputs,
wherein the video switching signal is received by the interface device over the data bus, the interface device generates a video switch instruction based on the received video switching signal and sends the generated video switch instruction to the switch, and the switch connects one or more of the video inputs to one or more of the video outputs according to the video switch instruction.

18. A method comprising:
generating a video control signal at a user interface;
sending the generated video control signal to a video controller;
generating a video switching signal based on the received video control signal the video controller;
sending the generated video switching signal to a video switch, the video switch including a control logic component operatively coupled to a video crosspoint switch that is, in turn, coupled to the plurality of video inputs and the plurality of video outputs, the control logic component receiving and interpreting the video instruction and outputting a video switch instruction to the video crosspoint switch based on the received video instruction; and connecting one or more of a plurality of video inputs to one or more of a plurality of video outputs at the video switch based on the generated video switching signal using the video crosspoint switch, wherein sending the generated video instruction to a switch including a control logic component includes sending the generated video instruction to a switch including a control logic component having:

- a local bus control logic component configured to receive and interpret control signals from the interface device;
- a command word buffer coupled to the local bus control logic component and configured to receive and buffer command words from the interface device, and local commands from the local bus control logic component; and
- a switch control state machine coupled to the command word buffer and configured to receive command words from the command word buffer and to condition the command words into an output signal suitable for input to the video crosspoint switch.

19. The method of claim 18, wherein the plurality of video inputs includes 16 video inputs and the plurality of video outputs include 16 video outputs.

20. The method of claim 18, wherein connecting includes connecting to one or more helmet display devices.

21. The method of claim 18, wherein sending the generated video switching signal to a video switch includes sending the generated video switching signal over a data bus.

22. The method of claim 21, wherein the data bus is a PCI bus.

23. The method of claim 22, further comprising implementing the video switch on a single circuit board according to a PMC formfactor.

24. The method of claim 18, wherein connecting one or more of a plurality of video inputs to one or more of a plurality of video outputs at the video switch based on the generated video switching signal includes:

receiving the video switching signal at an interface device of a switch device;

generating a video switch instruction at the interface device based on the received video switching signal;

sending the generated video switch instruction to the switch device; and connecting one or more of the video inputs to one or more of the video outputs at the switch device according to the video switch instruction.

* * * * *